US 7,447,872 B2

(12) United States Patent
Schroter et al.

(10) Patent No.: US 7,447,872 B2
(45) Date of Patent: Nov. 4, 2008

(54) INTER-CHIP PROCESSOR CONTROL PLANE COMMUNICATION

(75) Inventors: Russell Schroter, Apex, NC (US); John William Marshall, Cary, NC (US); Kenneth H. Potter, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 727 days.

(21) Appl. No.: 10/158,768

(22) Filed: May 30, 2002

(65) Prior Publication Data

US 2003/0225995 A1    Dec. 4, 2003

(51) Int. Cl.
*G06F 15/00* (2006.01)
(52) U.S. Cl. .......................... 712/10; 712/16
(58) Field of Classification Search ............. 710/52–57, 710/305–317, 33–38; 712/10–22; 709/238–250, 709/218–236; 370/229–236
See application file for complete search history.

(56) References Cited

U.S. PATENT DOCUMENTS

| 4,598,400 | A |   | 7/1986 | Hillis |
| 4,791,641 | A |   | 12/1988 | Hillis |
| 4,809,202 | A |   | 2/1989 | Wolfram |
| 4,870,568 | A |   | 9/1989 | Kahle et al. |
| 4,885,739 | A | * | 12/1989 | Read et al. ................... 370/384 |
| 4,922,418 | A |   | 5/1990 | Dolecek |
| 4,954,988 | A |   | 9/1990 | Robb |
| 4,993,028 | A |   | 2/1991 | Hillis |
| 5,070,446 | A |   | 12/1991 | Salem |
| 5,093,801 | A |   | 3/1992 | White et al. |
| 5,093,920 | A |   | 3/1992 | Agrawal et al. |
| 5,117,420 | A | * | 5/1992 | Hillis et al. ................. 370/400 |
| 5,129,077 | A |   | 7/1992 | Hillis |
| 5,151,996 | A |   | 9/1992 | Hillis |
| 5,191,578 | A | * | 3/1993 | Lee ............................. 370/418 |
| 5,475,856 | A |   | 12/1995 | Kogge |
| 5,481,669 | A |   | 1/1996 | Poulton et al. |
| 5,504,918 | A |   | 4/1996 | Collette et al. |
| 5,613,136 | A |   | 3/1997 | Casavant et al. |
| 5,617,538 | A |   | 4/1997 | Heller |
| 5,768,609 | A | * | 6/1998 | Gove et al. ..................... 712/11 |
| 5,784,702 | A | * | 7/1998 | Greenstein et al. .......... 711/173 |
| 5,832,291 | A |   | 11/1998 | Rosen et al. |
| 5,960,211 | A |   | 9/1999 | Schwartz et al. |
| 5,966,528 | A |   | 10/1999 | Wilkinson et al. |
| 5,974,051 | A |   | 10/1999 | De Nicolo et al. |
| 6,101,599 | A |   | 8/2000 | Wright et al. |
| 6,119,215 | A |   | 9/2000 | Key et al. |

(Continued)

OTHER PUBLICATIONS

International Search Report PCT/US 03/16557.

*Primary Examiner*—Meng-Ai An
*Assistant Examiner*—Charles E Anya
(74) *Attorney, Agent, or Firm*—Cesari and McKenna LLP (57) ABSTRACT

An inter-chip communication (ICC) mechanism enables any processor in a pipelined arrayed processing engine to communicate directly with any other processor of the engine over a low-latency communication path. The ICC mechanism includes a unidirectional control plane path that is separate from a data plane path of the engine and that accommodates control information flow among the processors. The mechanism thus enables inter-processor communication without sending messages over the data plane communication path extending through processors of each pipeline.

24 Claims, 9 Drawing Sheets

U.S. PATENT DOCUMENTS

| | | |
|---|---|---|
| 6,173,386 B1 | 1/2001 | Key et al. |
| 6,195,739 B1 * | 2/2001 | Wright et al. .................. 712/19 |
| 6,229,553 B1 | 5/2001 | Duluk, Jr. et al. |
| 6,304,568 B1 * | 10/2001 | Kim ........................... 370/387 |
| 6,591,326 B1 * | 7/2003 | Ichikawa et al. ............ 710/316 |
| 6,680,934 B1 * | 1/2004 | Cain ........................... 370/352 |
| 6,888,843 B2 * | 5/2005 | Keller et al. ................. 370/429 |
| 6,938,094 B1 * | 8/2005 | Keller et al. ................. 709/238 |
| 2002/0041606 A1 * | 4/2002 | Chin et al. ................... 370/468 |
| 2002/0194369 A1 * | 12/2002 | Rawlins et al. .............. 709/238 |

* cited by examiner

INTER-CHIP PROCESSOR CONTROL PLANE COMMUNICATION

CROSS-REFERENCE TO RELATED APPLICATIONS

The present invention is related to the following and commonly assigned U.S. patent application Ser. No. 09/663,777, now issued as U.S. Pat. No. 6,965,615, titled, Packet Striping Across a Parallel Header Processor, filed on Sep. 18, 2000 and assigned to the assignee of the present invention.

FIELD OF THE INVENTION

The present invention relates to inter-processor communication and, in particular, to communication among processors of an arrayed processing engine of an intermediate network station.

BACKGROUND OF THE INVENTION

A systolic array provides a common approach for increasing processing capacity of a computer system when a problem can be partitioned into discrete units of works. In the case of a one dimensional systolic array comprising a single "row" of processing elements or processors, each processor in the array is responsible for executing a distinct set of instructions on input data before passing it to a next element of the array. To maximize throughput, the problem is divided such that each processor requires approximately the same amount of time to complete its portion of the work. In this way, new input data can be "pipelined" into the array at a rate equivalent to the processing time of each processor, with as many units of input data being processed in parallel as there are processors in the array. Performance can be improved by adding more elements to the array as long as the problem can continue to be divided into smaller units of work. Once this dividing limit has been reached, processing capacity may be further increased by configuring multiple rows in parallel, with new input data allocated to the first processor of a next row of the array in sequence.

In the case of a parallel processor systolic array, data typically flows from one processor to the next in a row over a data plane path of the array. An example of such a systolic array is the processing engine disclosed in U.S. patent application Ser. No. 09/106,478 titled Programmable Arrayed Processing Engine Architecture for a Network Switch, by Darren Kerr et al., which application is hereby incorporated by reference as though fully set forth herein. The processing engine generally comprises an array of processors embedded between an input buffer and an output buffer of an intermediate network station, such as a network switch. The processors are symmetrically arrayed as rows and columns, wherein the processors of each row are configured as stages of a pipeline that sequentially execute operations on data, such as Internet protocol (IP) packets, passed serially among the processors.

Although the data plane path is intended primarily for packet data flow, that path may be used for communication among processors of the engine, particularly between an upstream processor and a downstream processor of a pipeline. Here, packet flow over the data plane path is unidirectional between those processors. By inserting control information in a packet, the upstream processor may communicate with the downstream processor in a manner consistent with packet data flow through the processing engine. However, the data plane path typically contains substantial buffering and, as a result, utilization of that path for processor communication may incur significant latency.

Use of the data plane path for communication among other processors of the engine may be more difficult and time consuming. In particular, for a downstream processor to communicate with an upstream processor, the control packet must flow an additional pass through the processor pipeline. In addition to incurring long latency, this approach may waste substantial processing resources. Moreover, use of a data plane communication path may be impossible for processors in different pipelines.

SUMMARY OF THE INVENTION

Briefly, the present invention relates to an inter-chip communication (ICC) mechanism that enables any processor in a pipelined arrayed processing engine to communicate directly with any other processor of the engine over a low-latency communication path. The ICC mechanism includes a unidirectional control plane communication path that is separate from a data plane path of the engine and that accommodates control information flow among the processors. The control plane path is coupled to ICC interface logic circuits associated with the processors. Each ICC interface logic circuit is configured to create a multi-bit ICC message in response to an ICC request issued by any source processor and, if appropriate, forward that message in a "backward" direction (opposite to that of the data plane path) over the control plane path to any destination processor. As a result, the novel mechanism enables inter-processor communication without sending messages over the data plane path extending through processors of each pipeline.

In the illustrative embodiment, each processor in the processing engine is configured with a unique address. Communication over the control plane path involves the use of the multi-bit ICC message that includes the unique addresses of the source processor initiating generation of the message and the destination processor receiving the message. The ICC message may also be sent to a group of processors in a same stage of the processor pipeline, as opposed to an individual processor. In this latter case, any one of the processors in that pipeline stage may process the incoming message.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF THE ILLUSTRATIVE EMBODIMENTS

Figure 1:
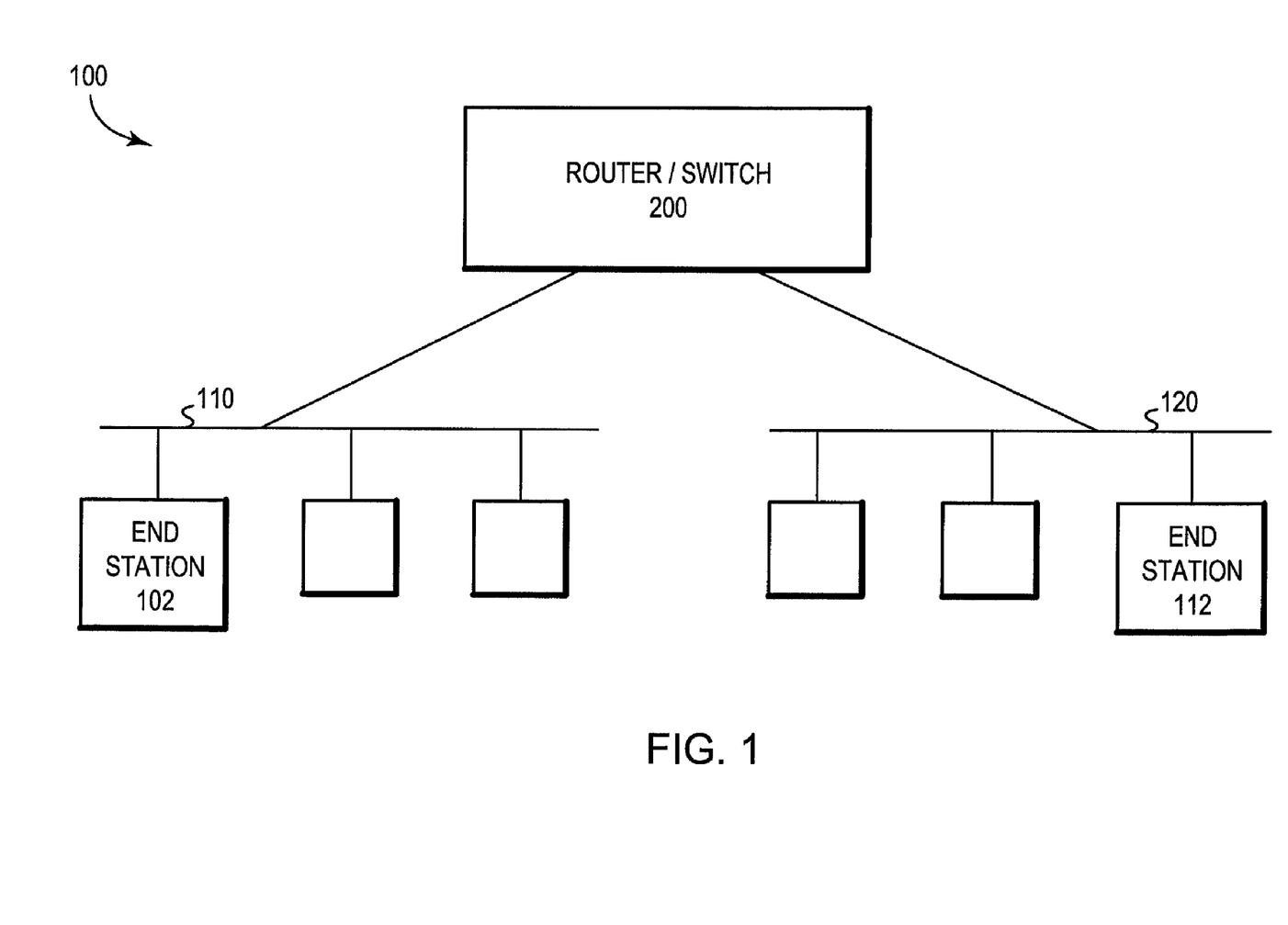
FIG. 1 is a block diagram of a computer network comprising a collection of interconnected communication media and subnetworks attached to a plurality of stations.

FIG. 1 is a block diagram of a computer network 100 comprising a collection of interconnected communication media and subnetworks attached to a plurality of stations. The stations are typically computers comprising end stations 102, 112 and intermediate station 200. The intermediate station 200 may be a router or a network switch, whereas the end stations 102, 112 may include personal computers or workstations. The subnetworks generally comprise local area networks (LANs) 110 and 120, although the invention may work advantageously with other communication media configurations such as point-to-point network links. Communication among the stations of the network is typically effected by exchanging discrete data frames or packets between the communicating stations according to a predefined protocol. For the illustrative embodiment described herein, the predefined protocol is the Internet protocol (IP), although the invention could be implemented with other protocols, such as the Internet Packet Exchange, AppleTalk or DECNet protocols.

Figure 2:
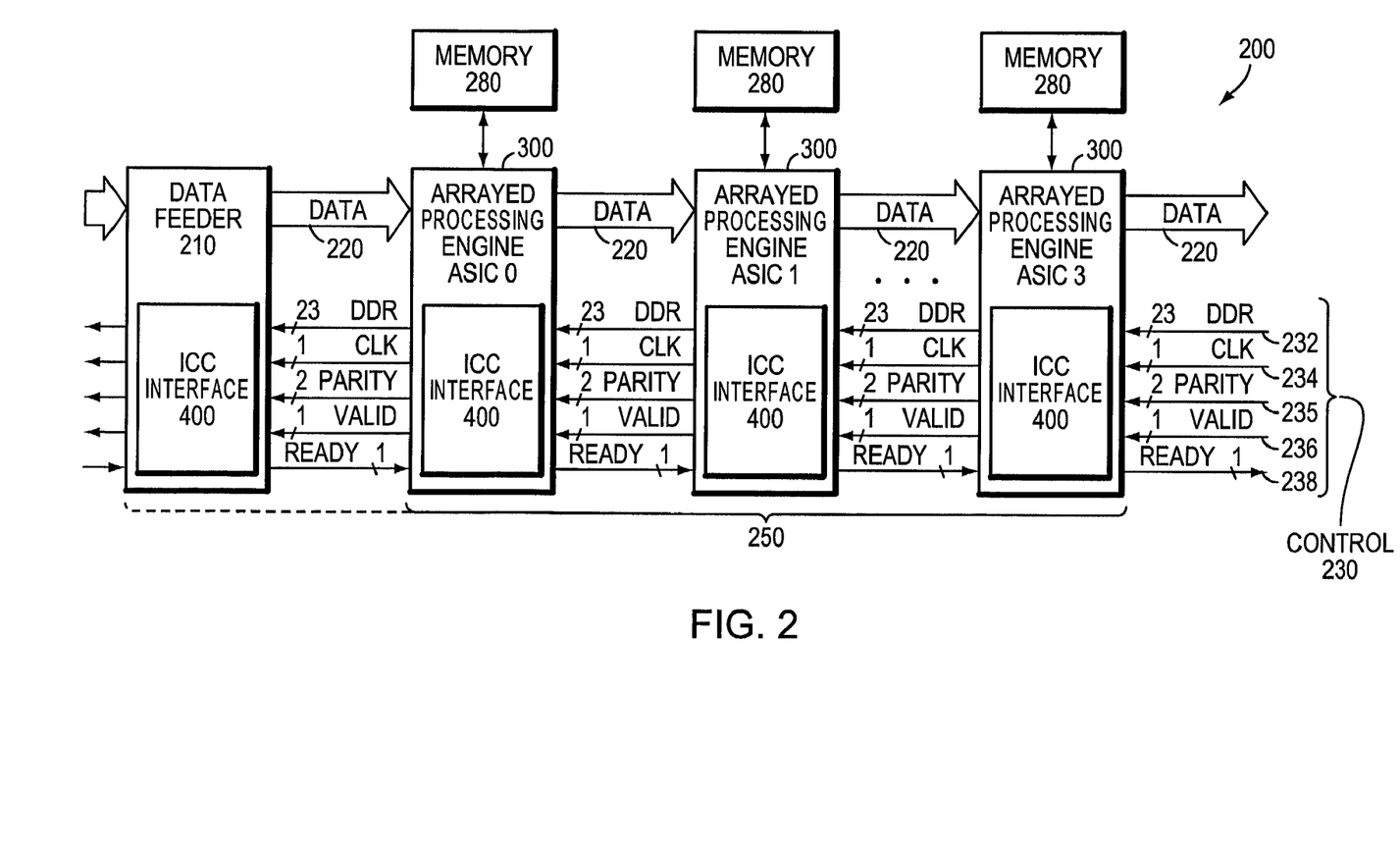
FIG. 2 is a partial schematic block diagram of an intermediate station, such as a network switch, having a control plane communication path according to the present invention.

FIG. 2 is a partial schematic block diagram of intermediate station 200 that, in the illustrative embodiment, is a network switch. The switch generally performs layer 2 processing functions, although it may be configured to implement layer 3 forwarding operations. In addition, the intermediate station may be configured as a router to perform layer 3 route processing. A feature of the intermediate station architecture is the ability to program the station for execution of layer 2, layer 3 or higher-layer operations. Operation of the switch is generally described with respect to IP switching of packets, although the switch may be programmed for other applications, such as data encryption.

The switch 200 comprises a plurality of interconnected components including a data feeder device 210, various memories and an arrayed processing engine 250. The memories generally comprise random access memory storage locations addressable by the processing engine and logic for storing software programs and data structures accessed by the components. An operating system, portions of which are typically resident in memory and executed by the engine, functionally organizes the switch by, inter alia, invoking network operations in support of software processes executing on the switch. It will be apparent to those skilled in the art that other memory means, including various computer readable media, may be used for storing and executing program instructions pertaining to the inventive technique and mechanism described herein.

The arrayed processing engine 250 may be embodied as a plurality of application specific integrated circuits (ASICs) 300, each of which is coupled to an external memory 280. The external memory stores non-transient data organized within data structures for use in processing transient ("context") data. The non-transient data typically includes "table" data contained in forwarding and routing tables, statistics, access filters, encryption keys and/or queuing information. The data feeder device 210 contains buffers for temporarily storing context data, such as IP packets, received from the network 100. Thereafter, the device 210 delivers the context data to processors of the arrayed processing engine ASICs 300. In the illustrative embodiment, four (4) arrayed processing engine ASICs0-3 are serially interconnected with the data feeder device 210 by a data plane path 220 configured to pass a context from the feeder device 210 to one of the ASICs0-3. For purposes of depiction and description of the inventive technique and mechanism, the data feeder device 210 and ASICs0-3 may be collectively referred to herein as processing engine 250.

According to the present invention, an inter-chip communication (ICC) mechanism enables any processor in arrayed processing engine 250 to communicate directly with any other processor of the engine over a low-latency communication path. The ICC mechanism includes a unidirectional control plane path 230 that is separate from the data plane path 220 of the engine and that accommodates control information flow among the processors in a direction that is opposite to that of the data plane path 220. In particular, the control plane communication path 230 passes through the data feeder device 210 and each of the ASIC0-3 of the processing engine 250 before returning to the device 210 to effectively form a "loop" that extends through each of those devices. Whereas an upstream processor may pass context data to a downstream processor over the data plane path 220, a downstream processor may communicate with an upstream processor over the control plane path 230, as described further herein.

Notably, the control plane communication path 230 is a "low latency" path as opposed to a higher latency path through the data plane path 220. That is, there is a substantial amount of buffering, e.g., input/output buffers and context memories, within each processing engine ASIC 300 that operates to provide a high latency, context data flow path 220. In contrast, there is less buffering, e.g., registers and queues, over the control plane path 230. The low latency path 230 is therefore configured to provide an efficient mechanism for transferring control (communication) information among the processors of the processing engine 250. The novel mechanism further enables inter-processor communication without sending messages over the data plane path extending through processors of each pipeline.

Specifically, the ICC mechanism allows processors of the arrayed processing engine 250 to communicate outside the "in-band" data plane path 220 used to forward contexts among processors of a pipeline. In addition to processors of the processing engine, the ICC mechanism enables communication between other external devices, such as data feeder 210 or field programmable gate array (FPGA) devices. As described further herein, the ICC mechanism includes ICC interface logic circuits 400 associated with the processors and, to that end, contained on the ASIC and data feeder devices. The ICC interface logic is configured to create a multi-bit ICC message in response to an ICC request issued by a source processor of ASIC 300 and, if appropriate, forward that message in a "backward" direction (opposite to that of the data plane path 220) over the control path 230 to a destination processor or to the data feeder device 210.

The ICC interface logic circuits 400 are interconnected by control plane path 230 comprising a 23-bit data/address double data rate (DDR) line 232 and a 1-bit clock line 234 adapted to transport an ICC clock signal. The path 230 further comprises a 2-bit parity line 235 configured to carry parity information, along with line 236 that carries a 1-bit valid signal and line 238 that carries a 1-bit ready signal. The data/address interface for the ICC logic 400 is illustratively a DDR interface, although a single data rate (SDR) interface may be used to enable interfacing of the ICC logic 400 with a FPGA device. The DDR interface supports throughput of a multi-bit ICC message (e.g., a 46-bit message) with addressing every cycle, whereas the SDR interface supports the multi-bit message with addressing every other cycle. Parity line 235 carries 2-bits of parity information used to detect failures with the interface.

An ICC clock signal is forwarded over clock line 234 and received at the ICC interface 400 asynchronously with respect to an internal core clock within each ASIC or data feeder device. There is illustratively only one clock bit on the ICC interface. For DDR mode, data is captured on both the rising and falling edges of the ICC clock signal. For SDR mode, data is captured on only the rising edge of the clock signal.

Figure 4:
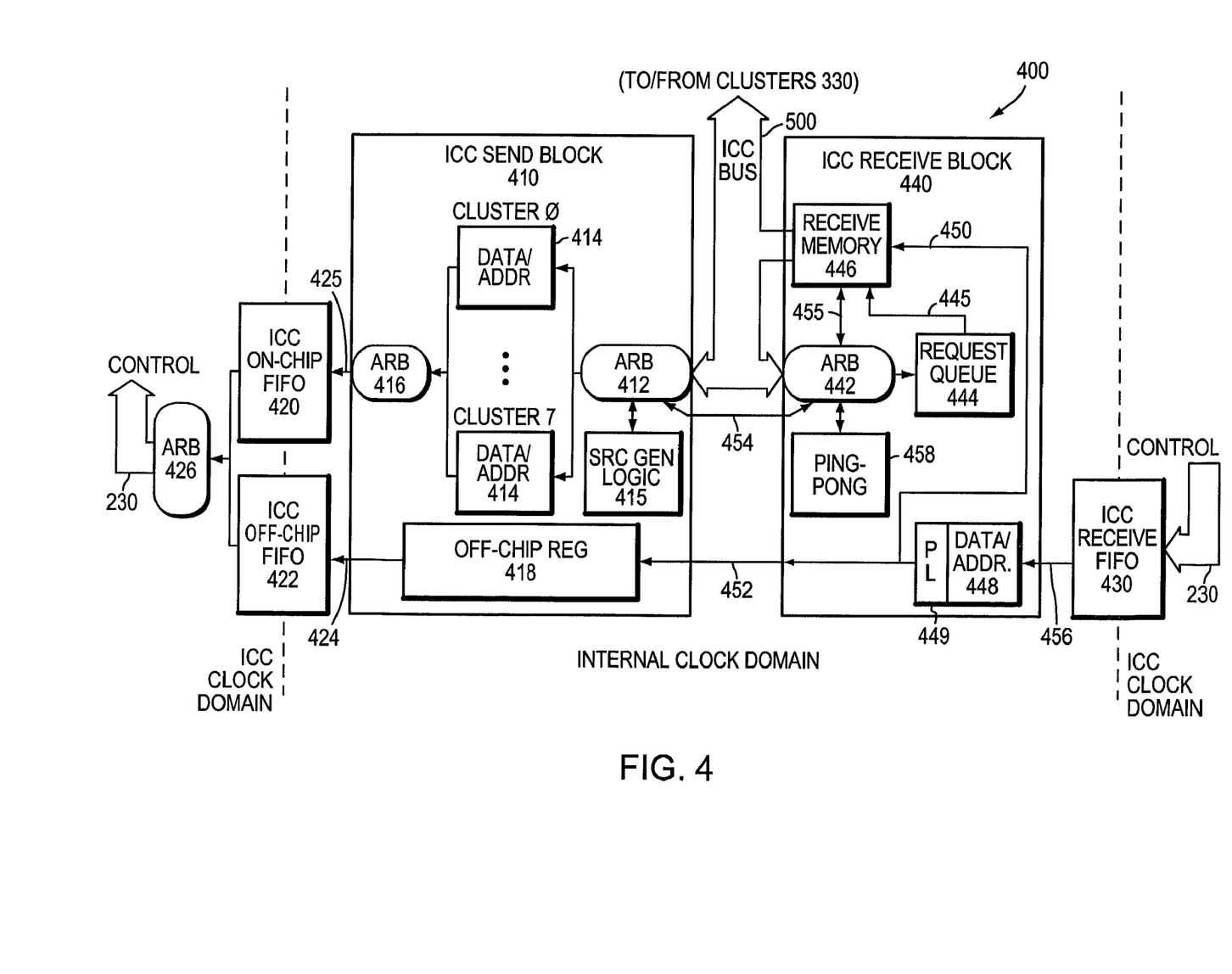
FIG. 4 is a schematic block diagram of inter-chip communication (ICC) interface logic, including ICC send and receive blocks, according to the present invention.

The valid and ready signals carried over lines 236, 238 control information flow over the ICC interface circuit 400. Assertion of the valid signal indicates that the DDR data is valid. The valid signal transitions on a positive (rising) edge of the ICC clock signal; therefore, an ICC receiver will receive 46 bits of data/address when the valid signal is asserted (active). In particular according to the DDR clocking mode, 23 bits of the data/address are transferred over the path 230 on the rising edge of a clock signal, whereas the remaining 23 bits are transferred over the path on the negative (trailing) edge of the clock signal. Assertion of the ready signal indicates the receiver of the ICC message is capable of receiving more data. When the ready signal transitions from active to inactive, the receiver may still be able to receive a small number of messages before a receive queue of the ICC logic 400 is overrun. The ready signal is an asynchronous signal that is synchronized on an ASIC or similar device before it is used internally.

Figure 3:
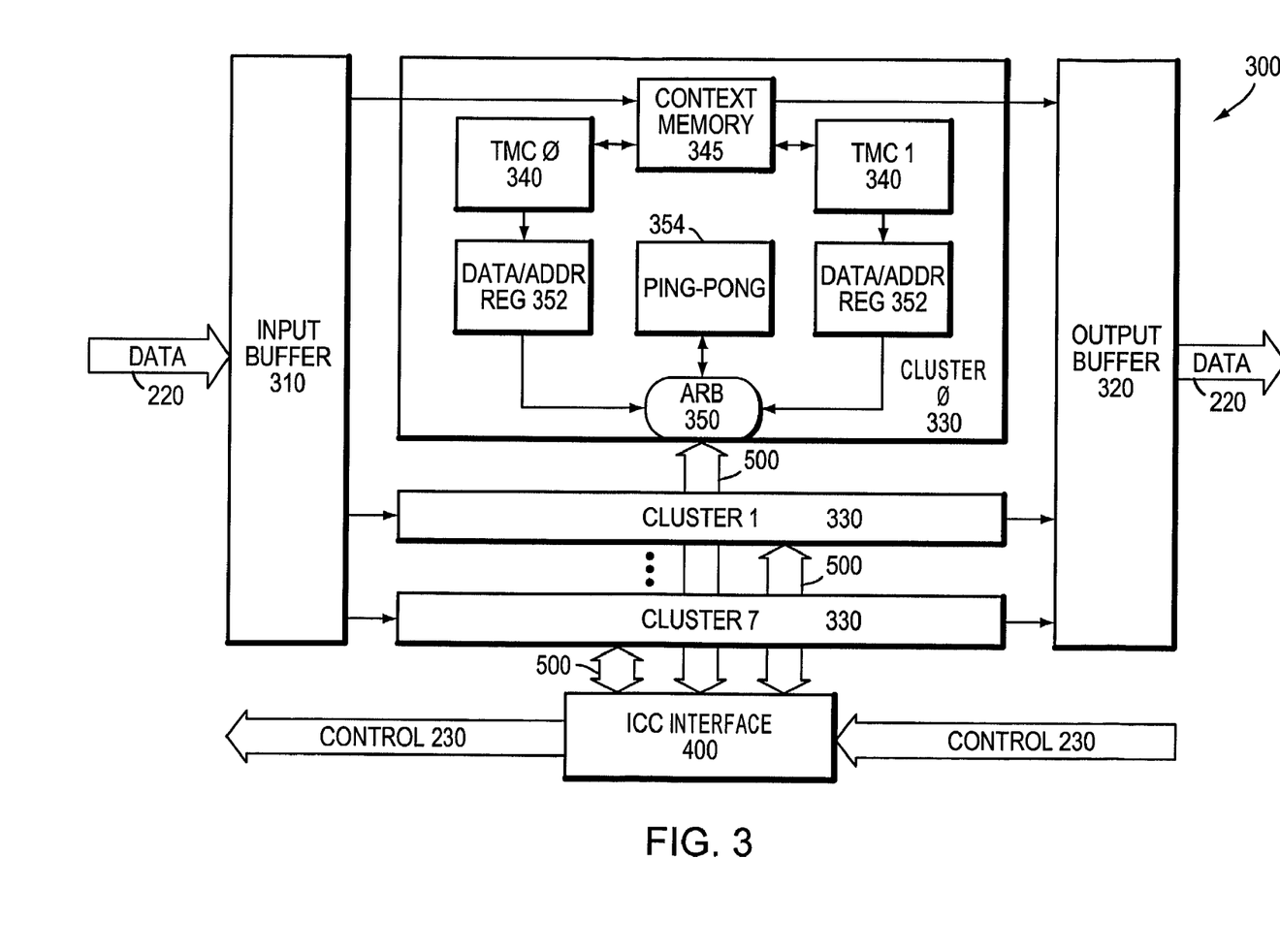
FIG. 3 is a schematic block diagram of a programmable arrayed processing engine having a plurality of processors configured as clusters.

FIG. 3 is a schematic block diagram of an arrayed processing engine ASIC 300 comprising an array of processors 340 embedded between input and output buffers. The processors 340 are illustratively arrayed into multiple rows and columns that may be further configured as a systolic array. In the illustrative embodiment, the processors are arrayed as eight (8) rows and two (2) columns in an 8×2 arrayed configuration that is embedded between an input buffer 310 and an output buffer 320. However, it should be noted that other arrangements, such as 4×4 or 8×1 arrayed configurations, may be advantageously used with the present invention. The processors of each row are connected to a context memory 345; collectively, these elements of the row are organized as a cluster 0-7 330.

Each processor is a customized, single-threaded microcontroller (TMC) 340 having a dense structure that enables implementation of similar processors on an ASIC. The present invention may apply to any number of processors within a column of the arrayed engine. The TMC 340 is illustratively a pipelined processor that includes, inter alia, a plurality of arithmetic logic units (ALUs) and a register file having a plurality of general purpose registers that store intermediate result information processed by the ALUs. Each TMC processor is configured with a unique 7-bit address that, as described further herein, comprises a 3-bit processor row identifier (ID), a 1-bit processor column ID and a 3-bit "chip" ID.

The processors (TMC 0,1) of each cluster0-7 330 execute operations on the transient data loaded into the context memory 345 by the input buffer 310 from data plane path 220, whereas the processors of each column operate in parallel to perform substantially the same operation on the transient data, but with a shifted phase. Each processor participates in a "software pipeline" phase and if processing by one processor of a cluster stalls (i.e., is delayed), all processors in that cluster are delayed. This arrangement can create undesired dependencies if all phases do not complete within a maximum interval and the transient data are unrelated. Upon completion of processing, each cluster0-7 330 forwards the transient data to output buffer 320 and over data plane path 220.

In addition to storing the transient data flowing through the cluster, the context memory 345 stores pointers that reference data structures and tables stored in, e.g., external memory 280 for use by the TMC 340. Each external memory 280 is coupled to a column of processors to thereby enable columned processor access to the non-transient data stored in that memory. The shared memory 280 accessed by the processors may further comprise entries of data structures, such as tables, that are constantly updated and accessed by the processors of each column. An example of such a table structure is the forwarding information base table used by the processing engine to perform forwarding operations.

Each cluster0-7 is coupled to ICC interface logic 400 via an ICC bus 500; therefore, each TMC processor 340 of a cluster shares a common ICC bus 500. An arbiter 350 is provided within each cluster 330 to arbitrate between simultaneous requests issued by the TMC processors 340 to access the bus 500. The arbiter comprises conventional arbitration logic organized to illustratively implement a "first come-first serve" arbitration policy. In the event each processor simultaneously issues a request for the ICC bus 500, a "ping-pong" conflict resolution policy is invoked to allow one of processors access to the bus. Specifically, a ping-pong register 354 is provided that "remembers" the last TMC processor granted access to the bus 500 as a result of a previous conflict. Upon occurrence of a subsequent conflict, the other TMC processor is granted access to the shared bus 500. Each processor has an associated data/address register 352 configured to hold data and address information generated by the TMC 340 until the arbitration logic 350 grants that processor access to the ICC bus 500.

Figure 5:
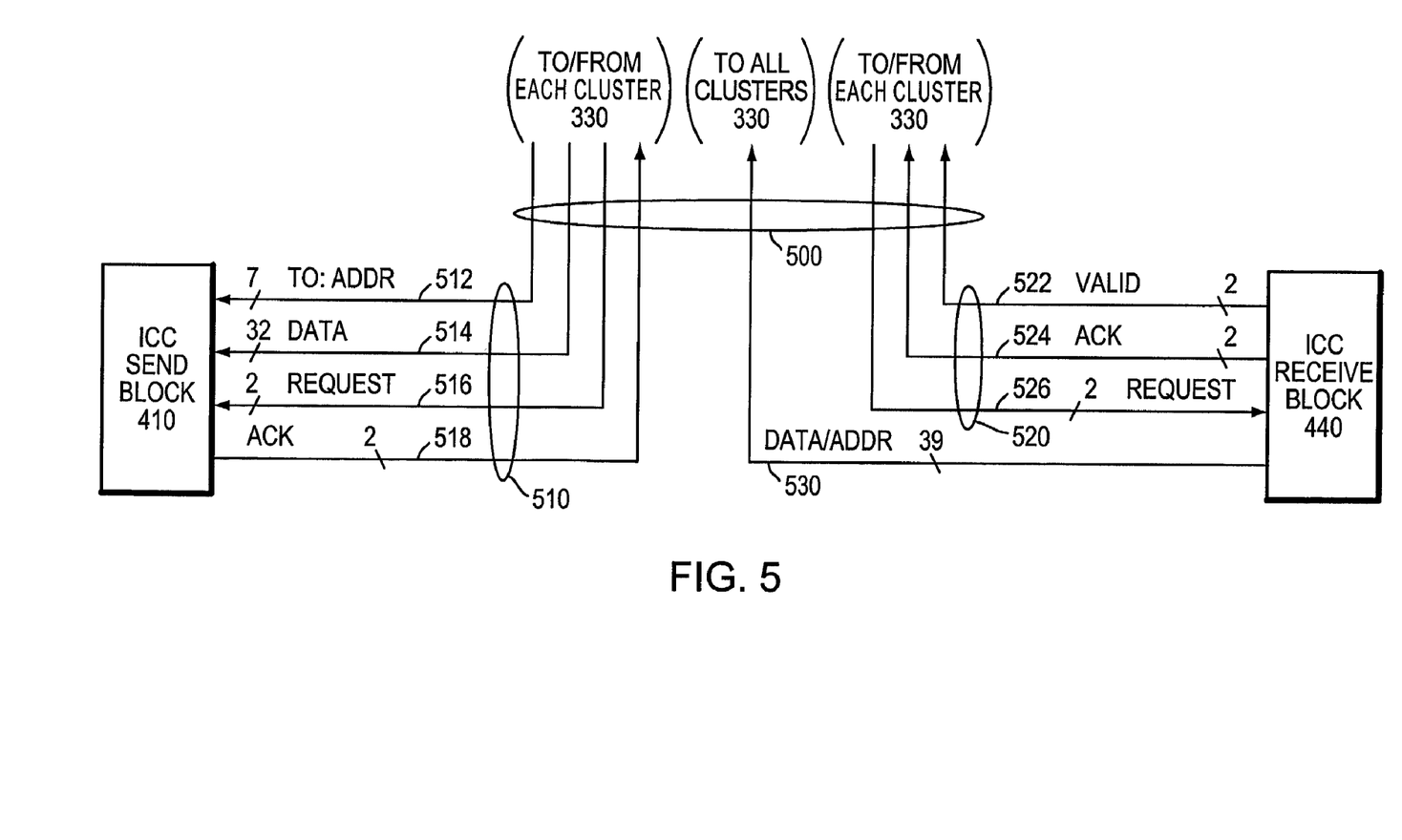
FIG. 5 is a schematic block diagram illustrating an ICC bus according to the present invention.
Figure 6:
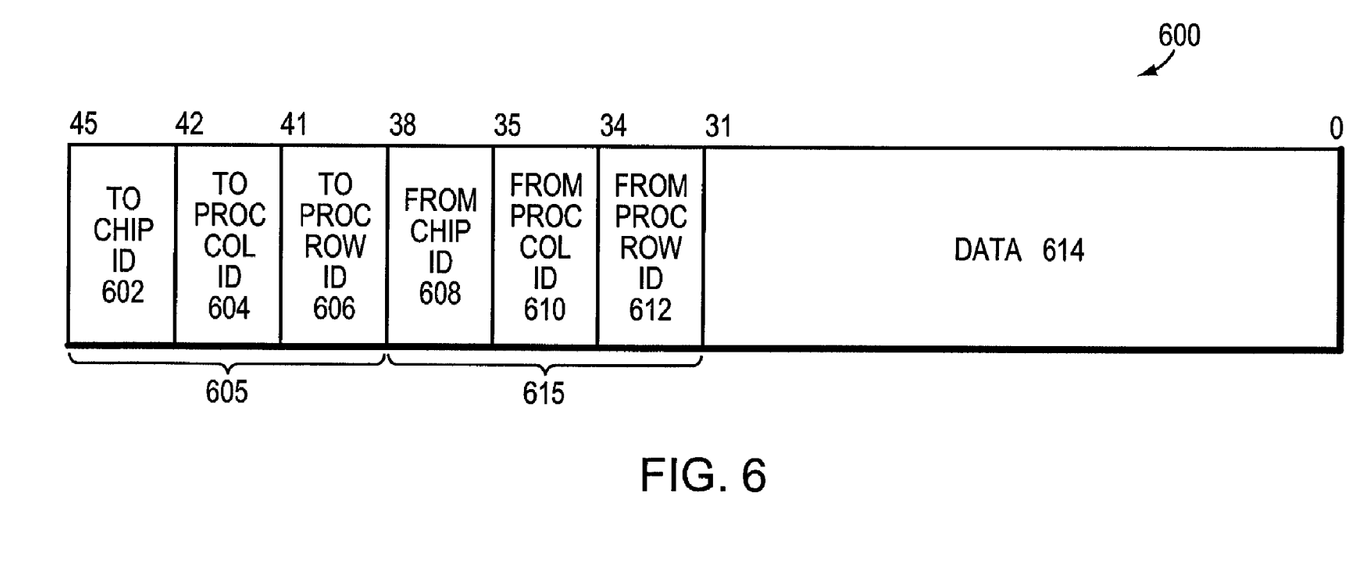
FIG. 6 is a schematic block diagram illustrating an ICC message according to the present invention.

FIG. 5 is a schematic block diagram illustrating the ICC bus 500 that comprises ICC bus segments 510-530. ICC bus segment 510 includes a plurality of communication lines coupled between each cluster 330 and an ICC send block 410 of the ICC interface logic 400. Therefore, in the illustrative embodiment, there are eight (8) ICC bus segments 510, each of which connects a cluster0-7 to the ICC interface logic 400 on the ASIC 300 or data feeder device 210. The ICC bus segment 510 includes a 7-bit To:Addr line 512 configured to carry a To address 605 (FIG. 6). The ICC bus segment 510 also includes a 2-bit request line 516 that indicates which processor of the cluster initiated an ICC communication request and a 2-bit acknowledge line 518 that carries an acknowledgement from the ICC send block 410 to the requesting processor of cluster 330. In addition, the bus segment 510 includes a 32-bit data line 514 adapted to carry a data word 614 of an ICC message 600.

The ICC bus 500 further comprises ICC bus segment 520 having a line 522 adapted to carry 2 bits of valid information from an ICC receive block 440 to the appropriate TMC processor 340 on each cluster 330. Request line 526 carries 2-bits of request information from a particular TMC processor on a cluster to the ICC receive block, whereas acknowledge line 524 carries 2 bits of acknowledgement from the receive block 440 to the processor on a cluster. In addition, the ICC bus 500 comprises an independent bus segment 530 that carries 39 bits of data/address information from the ICC receive block 440 to all clusters 330 of ASIC 300. The data/address information on segment 530 comprises 32 bits of data word 614 and 7 bits of a source (From) address 615 of the ICC message 600. The destination (To) address 605 is not needed because the information carried over bus segment 520 identifies the particular processor/cluster destined to receive the data/address 530 in accordance with the request/acknowledge handshake.

FIG. 6 is a schematic block diagram illustrating the ICC message 600 comprising a 32-bit data word 614, a 7-bit From (source) address 615 and a 7-bit To (destination) address 605. The data word 614 comprises 32 bits of information used by a source processor to communicate with a destination processor. The 7-bit From address 615 includes a 3-bit From processor row identification (ID) in field 612, a 1-bit From processor column ID in field 610 and a 3-bit From "chip" ID in field 608. The 7-bit To address 605 includes a 3-bit To processor row ID in field 606, a 1-bit To processor column ID in field 604 and a 3-bit To chip ID in field 602. Each 3-bit processor row ID illustratively supports up to 8 rows (clusters) for a default 8×2 row/column array for each ASIC 300. Each 3-bit chip ID illustratively supports up to 8 arrayed processing engine ASIC and/or data feeder devices.

In the illustrative embodiment, communication of the ICC message 600 over the control plane path 230 comprises multiple transfers. A first transfer comprises ICC message bits [45:39] and [31:16] over line 232. For this first transfer, parity bit [1] of line 235 covers ICC message bits [45:39] and [31:28], whereas parity bit [0] of line 235 covers ICC message bits [27:16]. A second transfer over line 232 of the path 230 comprises ICC message bits [38:32] and [15:0]. For the second transfer, parity bit [1] of line 235 covers ICC message bits [38:32] and [15:12], while parity bit [0] of line 235 covers ICC message bits [11:0]. The type of parity (e.g., even or odd) is programmable within an ICC configuration register.

To create an ICC message 600, microcode executing on a source TMC processor 340 generates an ICC communication request comprising the 32-bit data word 614 and the 7-bit To address 605 of the processor destined to receive the message. This ICC request information is then passed over ICC bus 500 to ICC interface logic 400, which generates the From address 615 of the message. Each ASIC 300 and data feeder device 210 has a unique chip ID that is programmed by a remote processor (RP) of the switch; the ICC interface 400 loads that ID into field 608 of the ICC message 600. The logic 400 then loads the 3-bit row ID representing the particular cluster associated with the source processor and the 1-bit column ID referring to either TMC0 or TMC1 of the cluster.

The ICC message 600 initiated by the source processor on a source ASIC may then be passed among ICC interface logic circuits 400 of the ASIC/data feeder devices in switch 200 until the message reaches its destination. The "From chip ID" 608 denotes the source device that originated the request, whereas the "To chip ID" 602 indicates the destination device of the message. If the ICC message is sent "off-chip" from a source device and is thereafter received at that source device, the ICC interface 400 discards the message because it is assumed that the To chip ID is invalid. That is, if the inbound ICC message contains a From chip ID in field 608 that is equal to the unique ID of the ICC logic 400 (hereinafter "ICC chip ID"), the message is discarded because it has circulated around the control plane path "loop" without being claimed. Therefore, for an ICC message transferred over line 456 from the FIFO 430 to the ICC receive block 440 to be "valid", the source ID must not be equal to the ICC chip ID.

FIG. 4 is a schematic block diagram of the ICC interface logic 400 comprising an ICC send block 410 coupled to an ICC receive block 440. An ICC on-chip first-in first-out (FIFO) queue 420 connects the ICC send block 410 to control plane communication path 230 and is configured to store ICC messages issued by a processor "internal" to an ASIC/data feeder device. The ICC on-chip FIFO 420 illustratively comprises 16 entries, each of which is 46 bits in length to accommodate an ICC message 600. The ICC interface logic 400 further comprises an ICC off-chip FIFO 422 configured to store an ICC message 600 that is "passed through" the ICC interface logic 400 of a device on route to a destination processor on another device of the processing engine 250. A conventional arbiter 426 is coupled to the FIFOs 420 and 422 to select an ICC message 600 for transfer over the control plane path 230.

The ICC interface logic also comprises an ICC receive FIFO queue 430 that connects the ICC receive block 440 to the control plane communication path 230 and is configured to store ICC messages received over path 230 and issued by a processor "external" to the device (ASIC or data feeder) on which the ICC interface logic resides. The ICC receive FIFO 430 illustratively contains 16 entries, each of which is 46 bits in length to accommodate an ICC message. Message information is written (loaded) into the FIFO 430 based on the DDR input clock and retrieved (read) from the FIFO 430 based on the internal core clock. These inbound ICC messages may be directed to TMC processors contained on the ASIC or to another ASIC/data feeder device.

Use of FIFOs at the interface of the ICC logic 400 enables utilization of the control plane communication path 230 among different applications. For example, the ICC logic and communication path (loop) may be coupled to devices embodied as field programmable gate array (FPGA) devices that do not run as fast as the ASICs 300. The use of FIFOs enables synchronization between devices coupled to the ICC mechanism that may operate on internal clocks that have different rates. Thus, the ICC on-chip FIFO 420, off-chip FIFO 422 and receive FIFO 430 essentially enable synchronization between an internal clock domain of the device (ASIC 300 or data feeder 210) and an ICC clocking domain of the ICC interface logic. These FIFOs support loading (writing) of information into their entries based on an internal core clock and retrieval (reading) of information from those entries based on an ICC DDR domain clock.

The ICC send block 410 includes a first conventional arbiter 412 adapted to receive ICC requests issued by TMC processors of clusters 330 within the device. The arbiter 412 illustratively implements a first-come first-serve policy and cooperates with ICC source generation logic 415 to formulate complete ICC messages, as described herein. A bank of data/address registers 414, one for each cluster 0-7 of the device, is provided to store ICC messages 600 destined for processors contained on ASICs or other devices of the engine. For example in response to a communication request issued by a source processor of a cluster to a destination processor external to the device on which the source processor is contained (i.e., an "off-chip" request), the arbiter 412 loads an ICC message received from the cluster into an appropriate register 414. A second conventional arbiter 416 is provided to select one of the data/address registers 414 to forward its contents over line 425 to the ICC on-chip FIFO buffer 420.

The ICC send block 410 also includes an off-chip register 418 used to store an ICC message 600 that is "passed through" the ICC interface logic 400 on route to, e.g., a destination TMC processor in the processing engine 250. The off chip register 418 illustratively receives 46 bits of the ICC message 600 over line 452 from the ICC receive block 440, along with handshaking signals that indicate whether register 418 is available to accommodate the ICC message. The offchip register 418 then forwards the message to the ICC off-chip FIFO 422 over line 424. As with the ICC on-chip FIFO 420, the ICC off-chip FIFO 422 has 16 entries, each of which is 46 bits in length to accommodate an ICC message 600.

The ICC receive block 440 comprises a conventional arbiter 442 configured to manage a receive memory 446 that stores ICC messages destined for processors on the (ASIC) device. The receive memory 446 illustratively includes 128 entries, each containing 46 bits to accommodate an ICC message 600. A request queue 444 is provided for storing requests issued by processors of the ASIC when "polling" to determine whether there are messages pending in the receive memory for those processors. The request queue illustratively comprises 4 entries, each of which accommodates a request issued from among the 16 processors on an ASIC 300. The receive block 440 also includes a data/address register 448 configured to store an ICC message 600 transferred from the receive FIFO 430.

Figure 7:
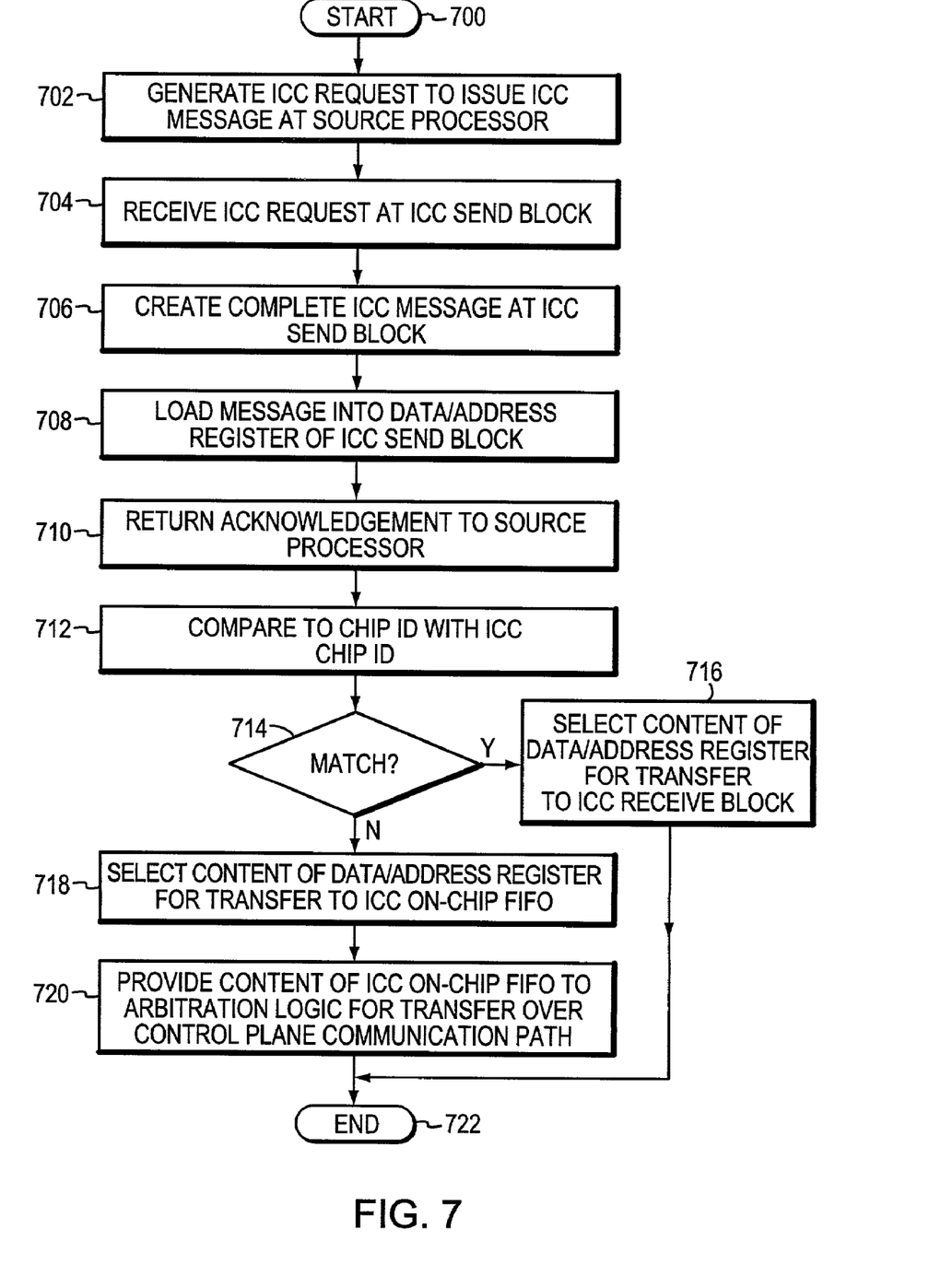
FIG. 7 is a flowchart illustrating the sequence of steps implemented by the ICC send block to generate and forward an ICC message in accordance with the present invention.

FIG. 7 is a flowchart illustrating the sequence of steps implemented by the ICC send block 410 to generate and forward an ICC message 600 in accordance with the present invention. The sequence starts at Step 700 and proceeds to Step 702 where a source TMC processor generates an ICC request to issue an ICC message to a destination processor of the engine 250. The ICC request includes a 32-bit data word 614 and a 7-bit To address 605 of the processor destined to receive the message. In Step 704, the ICC request is received at the ICC send block 410 where, at Step 706, arbitration logic of arbiter 412 cooperates with ICC source generation logic 415 to create a complete ICC message.

Specifically, ICC source address generation logic 415 produces the 7-bit From address 615 of the ICC message 600. To that end, the logic 415 acquires the From chip ID associated with the ICC logic of a particular ASIC or feeder device 210 and loads that ID into field 608. Note that the From chip ID may be acquired from persistent storage on the device or, alternatively, from a register of the ICC logic 400 configured by, e.g., the RP. Because there are illustratively eight (8) ICC bus segments 510 interfacing to the ICC send block 410, the source address generation logic 415 is able to identify which bus segment 510 carries the ICC message 600 from a particular cluster 330. Therefore, the logic 415 obtains the From processor row ID of that source cluster 330 and loads it into field 612 of the message 600. The logic further 415 monitors the state of the 2-bit request line 516 to determine which TMC processor 340 of the source cluster 330 issued the ICC request and, accordingly, captures the appropriate state value and loads it into the column ID field 610 for the message 600.

The arbitration logic 412 then loads that message into the appropriate data/address register 414 on block 410 at Step 708. An ICC request received from a cluster is loaded into the appropriate register 414 by arbitration logic 412 only if that register is "empty" (i.e., the contents of that register are invalid). In that event, the arbiter 412 generates and returns an appropriate acknowledgement signal over line 518 to the processor generating the ICC request at Step 710. Notably, the arbitration logic 412 does not generate an acknowledgment until the appropriate register 414 is available to be loaded with the current ICC request. Thus, the TMC processor 340 on the source cluster 330 must hold its data and address information valid until it receives the acknowledgement signal from the ICC send block 410.

The arbitration logic then determines the location of the destination processor receiving the message. To that end, the arbitration logic 412 compares the destination (To chip) ID 602 of the ICC message with the source (ICC chip) ID of the particular ICC logic 400 at Step 712. If, at Step 714, the IDs match (i.e., the destination is "on chip"), then the arbitration logic 412 selects the content of the appropriate data/address register 414 (i.e., the 46-bit message 600) for transfer over line 454 to arbitration logic 442 on ICC receive block 440 for storage in receive memory 446 at Step 716. Line 454 also includes handshaking signals such as, e.g., a 1-bit request signal from arbitration logic 412 to arbitration logic 442 and a 1-bit ready signal from the logic 442 to the arbitration logic 412. Transfer of an ICC message 600 over line 454 denotes that the ICC message generated by a source TMC 340 is destined for another TMC processor 340 on the same ASIC 300. The sequence then ends at Step 722.

However, if the destination ID of the ICC request does not match the source ID of the ICC logic 400 (Step 714), the destination processor for the ICC message 600 is "offchip" and, at Step 718, arbitration logic 416 of the ICC send block 410 selects one of the data/address registers 414 to provide its contents over line 425 to ICC on-chip FIFO 420. Information is transferred over line 425 to the on-chip FIFO 420 under the following illustrative condition: when the destination (To chip) ID of the ICC message 600 does not equal the source (ICC chip) ID of the ICC interface logic 400. The arbitration logic 416 illustratively implements a "first-come first-serve" arbitration policy among the bank of data/address registers 414 to thereby select the content of a particular register for transfer to the FIFO 420 and, ultimately, over control plane communication path 230.

In Step 720, the contents of FIFOs 420 and 422 are provided (forwarded) to arbitration logic 426 for transfer over the control plane communication path 230. The arbiter 426 illustratively implements an arbitration policy that gives priority to the off-chip FIFO 422 when selecting an ICC message 600. Priority is given to the off-chip FIFO 422 because the messages contain therein are typically generated before those messages residing within the on-chip FIFO 420. More significantly, the priority policy implemented by logic 426 provides a low latency communication path for messages that traverse multiple devices (ASIC 300 or data feeder 210) in the switch. It will be understood those skilled in the art that the arbitration policy may be altered to give priority to the on-chip FIFO 420. The sequence then ends at Step 722.

Figure 8:
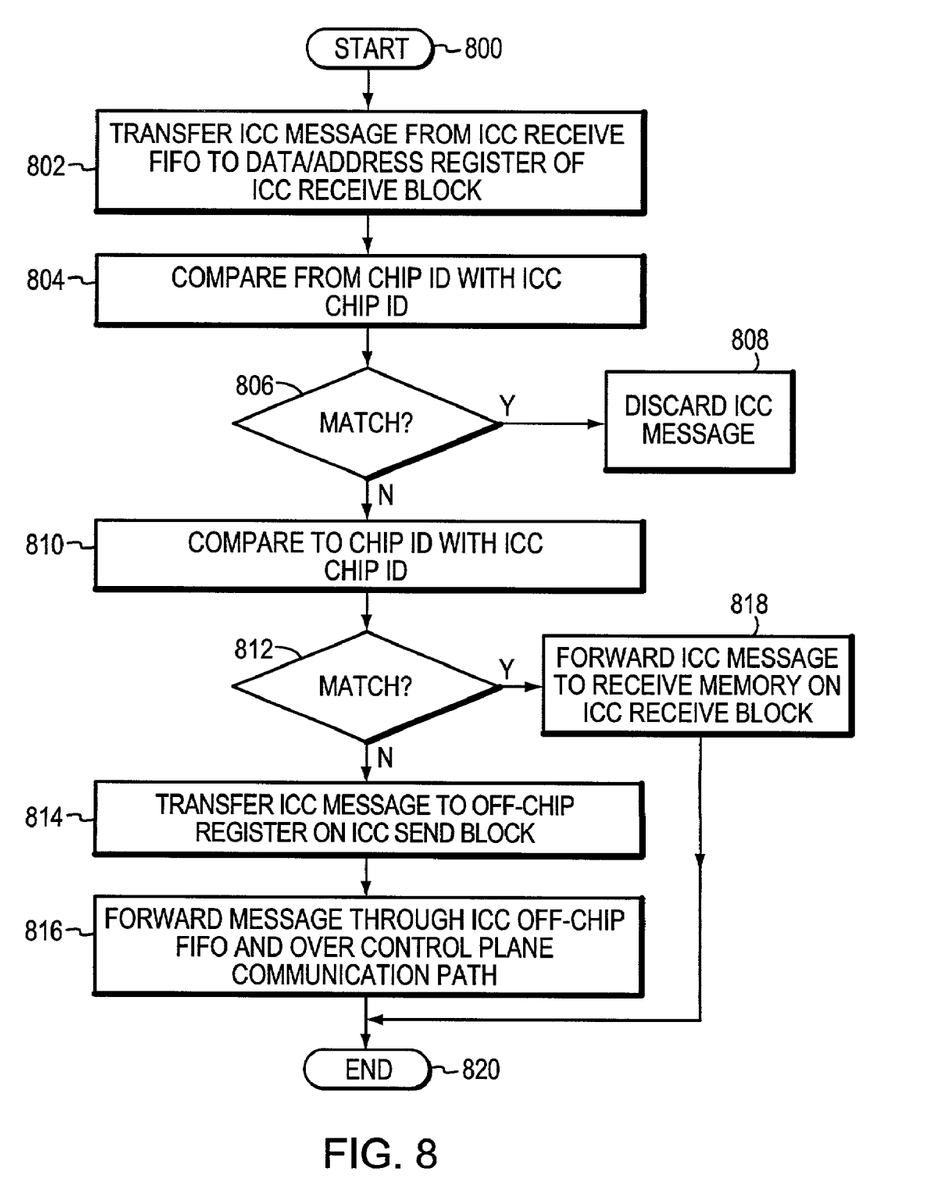
FIG. 8 is a flowchart illustrating the sequence of steps implemented by the ICC receive block in response to receiving an ICC message over the control plane communication path.

FIG. 8 is a flowchart illustrating the sequence of steps implemented by the ICC receive block 440 in response to receiving an ICC message 600 over the control plane communication path 230. The sequence starts at Step 800 and proceeds to Step 802 where an ICC message is transferred from the ICC receive FIFO 430 and stored in data/address register 448. Programmable logic (PL 449) embodied at the output of the data/address register 448 determines what action to take with the message. In Step 804, the programmable logic compares the From chip ID 608 of the message with the ICC chip ID of the device of the ICC logic 400. If there is a match in Step 806, the message is discarded in Step 808 because it has circulated around the control plane path "loop" without being claimed, as previously described. However, if there is not a match in Step 806 then, in Step 810, the programmable logic compares the (destination) To chip ID 602 with the ICC chip ID of the device.

If the destination ID does not match the ICC chip ID (Step 812), the ICC message is transferred over line 452 to the off-chip register 418 on the ICC send block 410 in Step 814. From there, the message is forwarded through the ICC off-chip FIFO 422 and over the control plane communication path 230 to another ASIC or data feeder device (Step 816). The sequence then ends at Step 820. On the other hand, if the destination ID matches the unique ICC chip ID of the device (Step 812), then the ICC message is forwarded over line 450 to receive memory 446 in Step 818. The sequence then ends at Step 820.

The receive memory 446 (and ICC receive block 440) may be configured to operate in one of two illustrative modes. A first row mode enables an ICC message to be directed to a specific processor 340 based on the To processor row ID 606 and column ID 604 of the destination address 605 of the ICC message 600. In row mode, the receive memory 446 is logically apportioned into sixteen (16) FIFOs, one for each TMC processor 340, wherein each FIFO contains eight, 46 bit entries. An ICC message directed to a particular TMC 340 is loaded into the appropriate segment of memory 446 as long as one of the eight entries is available.

A second column mode of operation enables an ICC message to be directed to any column of processors on the ASIC 300. For this mode of operation, the receive memory 446 is logically apportioned into two FIFOs, one for each column 0,1, wherein each FIFO contains sixty-four 46 bits entries. Because all processors in a column essentially perform the same work by executing essentially the same code, there are situations where a particular source processor may want to send an ICC message to any processor of a column. In the illustrative embodiment, a particular processor or column of processors identify whether an ICC message is destined for it by polling the ICC receive block 440 in accordance with a request/acknowledge handshake exchange over ICC bus segment 520.

Figure 9:
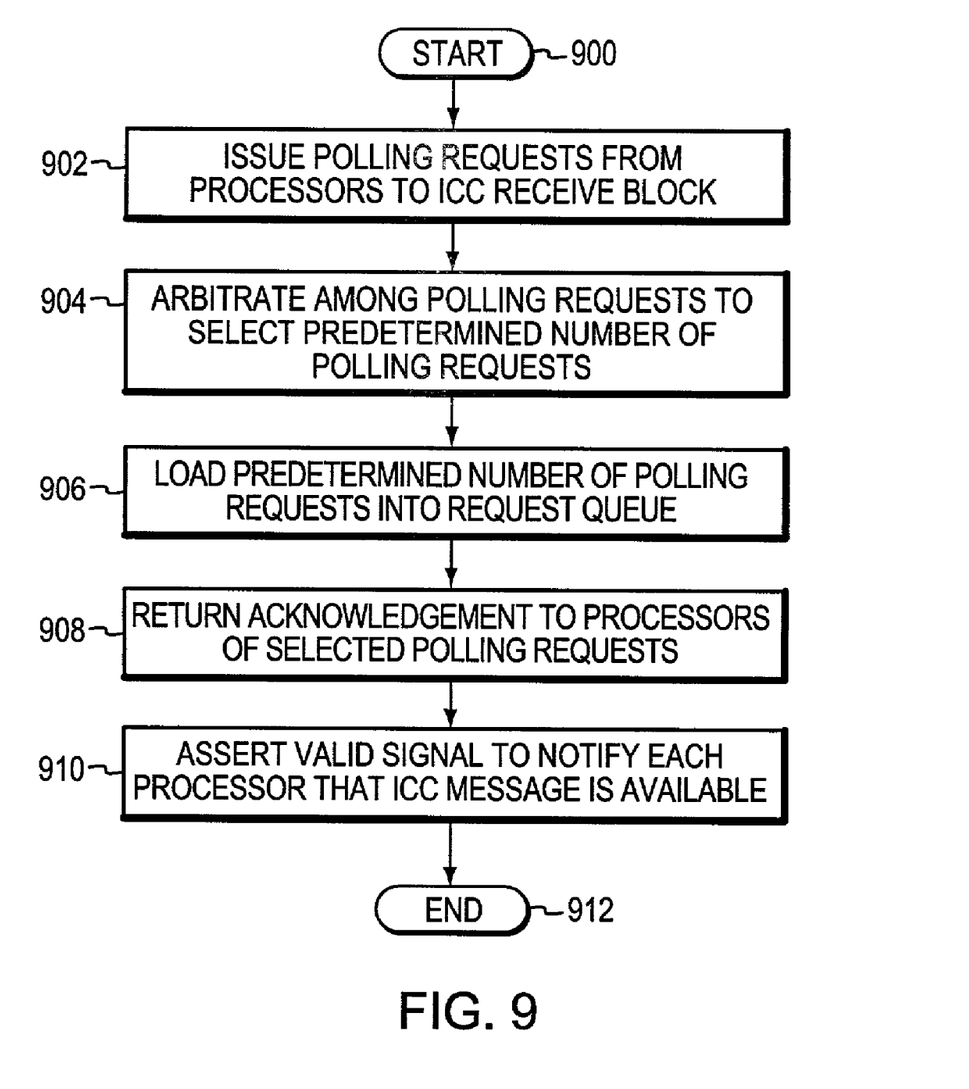
FIG. 9 is a flowchart illustrating the sequence of steps implemented by the ICC receive block in accordance with a request/acknowledge handshake exchange over ICC bus.

FIG. 9 is a flowchart illustrating the sequence of steps implemented by the ICC receive block 440 in accordance with the request/acknowledge handshake exchange over ICC bus segment 520. The sequence starts at Step 900 and proceeds to Step 902 where polling requests are issued by processors (e.g., TMC1) of clusters (e.g., cluster0) over bus segments 520 to determine whether there are pending ICC messages 600 residing in receive memory 446 that are destined for the processors. For each request, the arbitration logic 442 of the ICC receive block 440 receives an asserted bit over request line 526 corresponding to the processor, e.g., TMC1 of cluster0. Specifically, the 2-bit request line 526 extends from each cluster 330 of device 300 to the ICC receive block 440. Depending upon the states of its bits, the line 526 identifies a particular TMC processor 340 within the cluster. Therefore, a total of 16 request signals propagating over 8 lines 526 may be configured to identify each processor of an ASIC that may poll the receive memory 446.

In response to requests 526 of each ICC bus segment 520 received at the ICC receive block 440, arbitration logic 442 arbitrates among those requests/segments to select a predetermined number of requests (e.g., 4) at Step 904; these requests are then loaded into a request queue 444 at Step 906. As noted, the request queue illustratively comprises 4 entries, each of which accommodates a request issued from among the 16 processors on a device 300. Therefore, if each processor 340 on ASIC 300 issues a request to determine whether it has a pending ICC message 600 within the receive memory 446, the arbitration logic 442 selects a maximum of 4 requests on every clock cycle for loading into the request queue 444. Because the data/address segment 530 is common to all clusters, only one ICC message/request can be transferred to a particular processor/cluster over the bus segment 530 per clock cycle.

If there is sufficient capacity in the request queue 444, the logic 442 loads a selected request into the request queue and returns an appropriate acknowledgement signal over line 524 to the requesting processor, e.g., TMC1 (Step 908). The acknowledgement signal indicates that the request has been "queued" and that the ICC message will be delivered to that processor when it is available. A total of 16 acknowledgement signals (propagating over 8 lines 524) may be configured to identify each processor of the ASIC. Each acknowledgement signal is returned to a requesting processor at a fixed time (e.g., one or two cycles) after the request has issued. The acknowledgement may either be asserted or not asserted to indicate that the request has either been accepted or denied. Asserted acknowledgement signals are only returned over lines 524 to those TMC processors whose requests are loaded into request queue 444. Once an acknowledgement signal is returned to a requesting processor, that processor can expect the ICC message to be delivered over bus segment 530 within a fixed period (e.g., 4 cycles).

Moreover, 16 valid signals (propagating over 8 lines 522) may be configured to identify each processor of the ASIC. In Step 910, a requesting processor is notified that the data/address information of an ICC message over segment 530 is available for it by assertion of an appropriate valid signal over line 522 to that processor 340. That is, the 39 bits of data/address information is valid for a particular processor when an appropriate bit on line 522 is asserted by the ICC receive block 440. Essentially, the valid signals over line 522 separate the request/acknowledge handshake exchange over lines 524, 526 from the delivery of the actual data/address information over bus segment 530. This enables ordering of up to 4 simultaneous requests received at the ICC receive block 440 for ICC messages pending in the receive memory 446. The sequence then ends at Step 912.

It should be noted that if a particular TMC processor 340 issues a request to the ICC receive block 440 for an ICC message 600 that is not pending in receive memory 446, then that processor will not receive an acknowledgement signal over line 524. In that case, the processor must reissue its request at a later time. The arbiter 442 determines whether or not a message is pending for a particular TMC processor by inquiring over line 455 as to the state of the receive memory 446. If there is not an ICC message for a particular processor request, that request is not loaded into the request queue 444. Thus, the arbitration logic 442 only loads requests into queue 444 when there are ICC messages pending in memory 446 for those requests. An acknowledgement signal is therefore returned over line 524 only when the request issued over line 526 is loaded into the request queue 444.

While there has been shown and described an illustrative embodiment of a mechanism that enables any processor in a pipelined arrayed processing engine to communicate directly with any other processor of the engine over a low-latency communication path, it is to be understood that various other adaptations and modifications may be made within the spirit and scope of the invention. For example, further to the illustrative embodiment, the arbitration logic 442 may be configured to implement a "strict processor priority order" arbitration policy with respect to incoming requests issued by the TMC processors 340. According to this policy, processors of cluster0 have priority over processors of clusters1-7 and so forth. However, priority among processors of a cluster (e.g., TMC0,1) may "ping-pong" between columns 0 and 1. For example, assume a processor of cluster0/column0 makes a request, along with processors of cluster1/column1, cluster2/column0, and cluster5/column0. In addition, processors of cluster2/column1, cluster4/column1 and cluster5/column1 issue requests to retrieve ICC messages 600 from memory 446.

Assuming each of these processors issues a request on the same clock cycle, the arbitration logic 442 arbitrates among these incoming requests in accordance with the illustrative arbitration policy. Assuming further that the request queue 444 is empty, the arbiter 442 acknowledges two requests from column 0 and two requests from column 1, wherein the requests within each column are granted based on strict priority. Therefore, the arbitration logic 442 acknowledges requests issued by processors of cluster0/column0 and cluster1/column0, along with requests from processors of cluster2/column1 and cluster4/column1.

However, if there is one request currently pending in the request queue 444 such that the arbitration logic 442 can only acknowledge three of the incoming requests, the arbitration policy dictates that the column granted the odd (one) request is the column that was granted the even (two) request when a previous conflict arose. To that end, the arbitration logic 442 utilizes a ping-pong register 458 that indicates which column was given "priority" (i.e., the greater number of granted requests) during the last conflict. Therefore, the other column is granted priority during the arbitration period wherein an odd number of requests can be acknowledged.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A system adapted to enable any processor in a processing engine having a plurality of processors to communicate directly with any other processor of the processing engine, wherein the system is arranged internal to an intermediate network station, the system comprising:
    a unidirectional control plane communication path internal to the intermediate network station separate from a unidirectional data plane path internal to the intermediate network station, wherein the unidirectional control plane communication path is configured to accommodate control information flow among the plurality of processors, the control plane further configured to pass the control information flow in a direction opposite the direction of data flow among the processors on the unidirectional data plane path; and
    at least one inter-chip communication (ICC) interface logic circuit coupled to the unidirectional control plane communication path and associated with the plurality of processors, the ICC interface logic circuit configured to create a multi-bit ICC message in response to an ICC request issued by any source processor and forward the multi-bit ICC message over the unidirectional control plane communication path to any destination processor of the processing engine, wherein the ICC interface logic circuit associated with the plurality of processors is contained on one of an application specific integrated circuit (ASIC) and data feeder device of the processing engine, wherein the plurality of processors are arrayed into multiple rows and columns, and wherein each row of processors is organized as a cluster.

2. The system of claim 1, wherein the control plane communication path is a low latency communication path.

3. The system of claim 1, wherein the multi-bit ICC message includes unique addresses of the source processor initiating generation of the multi-bit ICC message and the destination processor receiving the multi-bit ICC message.

4. The system of claim 1, wherein the ICC interface logic circuit comprises an ICC send block coupled to an ICC receive block.

5. The system of claim 4, wherein the ICC interface logic circuit further comprises an ICC on-chip first-in first-out (FIFO) that connects the ICC send block to the control plane communication path, the ICC on-chip FIFO configured to store a first ICC message issued by a source processor internal to a device.

6. The system of claim 5, wherein the ICC interface logic circuit further comprises an ICC off-chip FIFO configured to store a second ICC message that passes through the ICC interface logic circuit on route to a destination processor of the processing engine.

7. The system of claim 4, wherein the ICC interface logic circuit further comprises an ICC receive first-in first-out (FIFO) that connects the ICC receive block to the control plane communication path, the ICC receive FIFO configured to store a first ICC message issued by a source processor external to the device on which the ICC interface logic is contained.

8. The system of claim 7, wherein the ICC receive block comprises a receive memory configured to store the first ICC message destined for at least one destination processor on the device.

9. The system of claim 8, wherein the receive memory is configured to operate in a row mode that enables the first ICC message to be directed to a specific destination processor on the device.

10. The system of claim 8, wherein the receive memory is configured to operate in a column mode that enables the first ICC message to be directed to a column of destination processors on the device.

11. The system of claim 1, further comprising an ICC bus coupling each cluster to the ICC interface logic circuit, such that each processor of the cluster shares the ICC bus.

12. The system of claim 11, further comprising an arbiter of each cluster adapted to arbitrate between simultaneous requests issued by the processors of the cluster to access the ICC bus.

13. The method of claim 1 wherein the multi-bit ICC message is directed to a group of processors rather than an individual processor, wherein any available one of the processors of the group may service the ICC message.

14. An apparatus comprising:
    a plurality of processors organized into a processing engine internal to an intermediate network station, a first plurality of the processors organized into a first cluster a second plurality of the processors organized into a second cluster and a third plurality of the processors organized into a third cluster, wherein the processors of the second and third clusters are arranged into a plurality of columns;
    a control plane of the processing engine internal to the intermediate network station, separate from a data plane path of the processing engine internal to the intermediate network station, the control plane including a unidirectional control plane communication path configured to pass control information in a direction opposite the direction of data flow among the clusters on a unidirectional data plane communication path;
    a first inter-chip communication (ICC) interface logic circuit coupled to the control plane communication path and associated with the first cluster of processors;
    a second inter-chip communication (ICC) interface logic circuit coupled to the control plane communication path and associated with the second cluster of processors and the third cluster of processors; and
    wherein the first ICC interface logic circuit is configured to create a ICC message in response to an ICC request issued by a first processor of the first cluster to communicate with any available processor of a particular column, the available processor being in the second or third clusters, the first ICC interface logic circuit also configured to forward the ICC message over the control plane communication path, and the second ICC interface logic circuit configured to receive and store the ICC message, and to notify an available processor that the ICC message is available.

15. The apparatus of claim 14, further comprising:
an ICC bus coupling each processor of the first cluster to the first ICC interface logic circuit, each processor of the first cluster to share the ICC bus.

16. The apparatus of claim 15, further comprising:
an arbiter coupled to the first cluster and configured to arbitrate between simultaneous requests issued by the processors of the first cluster to access the ICC bus.

17. The apparatus of claim 14, wherein the second ICC interface logic is configured to deliver the ICC message to the second processor of the second cluster if the second processor is available.

18. The apparatus of claim 14 further comprising:
a receive first-in first-out (FIFO) coupled to the control plane communication path, the receive FIFO configured to store the ICC message.

19. The apparatus of claim 14, wherein the ICC request lacks a From address, and the ICC interface logic circuit is further configured to produce a From address in response to the ICC request and to create an ICC message that includes the From address.

20. The method of claim 14, wherein the ICC request lacks a From address and the step of creating an ICC message further comprises:
producing a From address in response to the ICC request; and
including the From address in the ICC message.

21. A method comprising:
issuing an inter-chip communication (ICC) request by a first processor of first plurality of the processors organized into a first cluster internal to an intermediate network station to communicate with an available processor of a particular column processor of a second plurality of the processors organized into a second cluster internal to the intermediate network station and a third plurality of the processors organized into a third cluster internal to the intermediate network station, the processors of the second and third clusters arranged in a plurality of columns;

in response to the ICC request, creating an ICC message at an ICC interface logic circuit associated with the first cluster of processors;

forwarding the ICC message over a unidirectional control plane communication path internal to the intermediate network station in a direction opposite the direction of data flow among the clusters on a unidirectional data plane communication path;

receiving and storing the ICC message at a second ICC interface logic circuit associated with the second cluster and the third cluster;

directing the ICC message to any available processor of the particular column rather than to a particular processor of the particular column, the available processor being in either the second or third clusters; and notifying an available processor that the ICC message is available.

22. The method of claim 21, further comprising:
coupling each processor of the first cluster to the first ICC interface logic circuit with an ICC bus, each processor of the first cluster sharing the ICC bus.

23. The method of claim 22, further comprising:
arbitrating between simultaneous requests issued by the processors of the first cluster to access the ICC bus.

24. The method of claim 21, further comprising:
delivering the ICC message to a second processor of the second cluster if the second processor is available.

* * * * *